United States Patent [19]
Glydon et al.

[11] Patent Number: 5,658,179
[45] Date of Patent: Aug. 19, 1997

[54] SPORTS BOARD AND METHOD OF MAKING

[75] Inventors: Jon Anthony Glydon, West Barnstable, Mass.; Charles E. Flathers, Jr., Diablo; Rita F. Kerr, Madera, both of Calif.

[73] Assignee: Earth & Ocean Sports, Inc., Hyannis, Mass.

[21] Appl. No.: 518,073

[22] Filed: Aug. 22, 1995

[51] Int. Cl.$^6$ .................................................. B63B 35/79
[52] U.S. Cl. ........................... 441/74; 441/65; 428/422
[58] Field of Search ................ 441/65, 74; 114/357; 280/601, 602, 609, 610, 845; 428/314.4, 315.9, 316.6, 317.3, 192, 422

[56] References Cited

U.S. PATENT DOCUMENTS

| | | | |
|---|---|---|---|
| 4,850,913 | 7/1989 | Szabad, Jr. | 441/65 |
| 5,211,593 | 5/1993 | Schneider et al. | 441/65 |
| 5,295,883 | 3/1994 | Moran | 441/65 |
| 5,480,721 | 1/1996 | Pozzoli et al. | 428/422 |

*Primary Examiner*—Jesus D. Sotelo
*Attorney, Agent, or Firm*—Richard P. Crowley

[57] ABSTRACT

A sports board, particularly a body board, for surfing purposes, which board is a preformed, preshaped foam board composed of closed-cell foam material, with an inner core of low density foam material and an outer core of foam material of greater density than the inner core. The board has a top and bottom surface and two sides, the sides containing outwardly extending angular side rails thereon, extending from one to the other end of the board, and around the front of the board. The board includes an integral thermoplastic polymer film material heat-laminated only to the bottom surface of the board, and to the lower side rail surface of the board. The polymer film material provides a low-frictional bottom surface and lower side rail surface and provides for enhanced mechanical stiffening of the board. A method of producing a sports board, particularly a body board for surfing purposes, which method includes applying a solid thermoplastic polymer film material from a roll form, cutting the material to size, and then heat-laminating the material, both to the bottom surface and lower side rail surface of the board, the film material characterized by having a low-frictional type, smooth gliding surface.

15 Claims, 2 Drawing Sheets

SPORTS BOARD AND METHOD OF MAKING

BACKGROUND OF THE INVENTION

Sports boards are generally preformed, preshaped, generally planar boards composed of a foam material with a gliding bottom surface for use on water, snow, grass, ice or other surfaces.

In particular, one type of sports board comprises a body or surf board and is employed in the water, particularly for use for surfing. Generally, body boards are formed or made of polyethylene, typically with a cross-linked polyethylene foam core, and have polyethylene foam sheets laminated to the polyethylene foam core. Body boards, when used for surfing purposes, may have a lower bottom surface composed of a polymeric film material, to provide a smooth or gliding slick finish to the lower surface of the board. This low-frictional surface creates less drag and promotes quick release from the surface on which the board is used. Generally, the lower surface of the body board has a thermoplastic polymer film, such as a cross-linked polymer, or a solid polyethylene film heat-laminated to the bottom surface. The polymer film material, so applied, may contain a thin layer of thermoplastic polymer on one side to promote the heat-laminating to the bottom surface of the board, while the other side has a glossy smooth surface. However, such film employed must be of a thickness, generally 20 mils or greater, sufficient to permit its application to the bottom surface without any wrinkling, as it is essential that the bottom surface be a smooth surface for gliding purposes.

Further, in sports boards, particularly boards used for surfing purposes, the boards should have outwardly extending side rails extending from one to the other end of the body board, optionally, and also partially around the front of the board, constituting an upper and lower side rail surface. Side rails are employed to permit a user to grasp the side rails and maneuver the board.

Sports boards may be made of a polymer material, but usually are composed of an inner core material of a lower density, and then having a higher density, closed-cell foam material, such as a polyethylene, heat-laminated to the top and bottom surface of the core foam, to form the overall preshaped, preformed sports board, and optionally outwardly extending straight or slightly arcuate side rails on the back surface of the board. Optionally, the board may also have a designed foot surface on the back, generally curved inwardly a short distance and having a flat, angular surface.

The upper and lower surfaces of the body board are generally composed of a closed-cell foam material, such as a cross-linked polyethylene foam material. The inner core foam material is generally of low density, such as two pounds psi, and the laminated upper and lower surfaces, which form the outer core, have a density of about six pounds psi. Where the sports board is employed in rugged sports pursuits, such as professional or semi-professional surfing, the board should be sufficiently stiff to maintain its planar shape with continued use.

A wide variety of sports boards, including body boards, are known. One such sports board, having a slick film surface about the entire surface, and the method of making such a sports board has been described in U.S. Pat. No. 4,850,913, issued Jul. 2, 1989, hereby incorporated by reference in its entirety. The sports board described comprises a preformed, preshaped foam core of closed-cell foam material, with a sheet of polyethylene film laminated to an outer layer sheet of polyethylene foam. The polyethylene film is laminated to all outer surfaces of the sports board, to completely cover the outer surface of the core. Such a sports board provides an outer, glossy, impervious polyethylene film surface for reducing friction and decreasing the board's ability to absorb water. The employment of a slick film surface totally covering all board surfaces is not wholly desirable, however, for all conditions and uses.

It is therefore desirable to provide for a new and improved sports board, particularly a body board used for surfing purposes, and a method for making such a board, and which method simplifies manufacturing of the board, and provides for a lower polymer film surface of reduced thickness, without the disadvantages associated thereof, and which provides a board with increased low-frictional surface only on the bottom surface and the lower side rails to provide enhanced stiffening properties. Further, the frictional top surface and top side rail surface allows for stability for the user on the board and increased ability to grasp and maneuver the board in use.

SUMMARY OF THE INVENTION

The invention relates to a sports board and a method for making same, and more particularly is directed to a body board for use in surfing purposes and method of making same. The sports board has enhanced mechanical stiffening and lower product and manufacturing costs.

The invention is directed to a sports board which comprises a preformed, preshaped board, typically but not limited to a body board for surfers, which board comprises a generally planar foam board, having a bottom surface and side rails extending from one to the other end of the board, and optionally partially around the front end. Generally, the board is planar in nature, and is composed of a closed-cell thermoplastic foam material, more particularly a polyethylene, and generally a cross-linked polyethylene material, the board arranged in construction in length, width and thickness to support a user's body for a desired sport, and characterized by a top surface, a bottom surface, two opposing sides and a front and back end.

The front and back end may be curved as desired to form a desired shape, and typically the front end would have the sides curved inwardly, arcuately slightly at the front end and have an outwardly curved tail at the back end. It is generally and particularly preferred that the two sides have side rails extending outwardly from the one to the other end of each side of the board, with the side rails coming out angularly to form, along a side rail intersection, an upper side rail surface and lower side rail surface. The amount of outward extension may range from say one-half to three inches, and at an angle from the plane of generally about 40–55 degrees.

The sports board has a thermoplastic polymer film laminated to the bottom surface of the board, completely covering the bottom surface of the board and extending integrally from the bottom surface of the board upwardly and laminated only to the lower side rail surfaces on each side of the board. The polymer film material is employed to provide a low-frictional gliding surface on the bottom and lower side rail surfaces of the board. The film has a thickness sufficiently low to permit the film material to be applied in roll form, generally a thickness of less than about 12 mils, and usually 3 to 10 mils. The film material so laminated provides bottom and lower side rail surfaces of low-frictional, slick or gliding surfaces, while the upper rail surfaces and the top surface comprises a higher friction, closed-cell foam material, such as a polyethylene foam material, which is a non-gliding, body-retaining surface, and therefore permits the user's body to remain thereon, and which includes the outwardly extending side rail upper surfaces, which permits the user to grasp and maneuver the board. The glidable material on the lower side rail surface increases the gliding surface of the board, without decreasing the control or maneuverability of the board by the user. Further, and importantly, the employment of the polymer film material, extending both integrally on the lower bottom surface and on the lower side rail surfaces of the board also provides for an increased mechanical stiffening to the board, without the need for an increased thickness of the board or increased foam density.

The invention includes a method of making a sports board, particularly a body board for aquatic or surfing use, and which method combines providing a preformed and preshaped foam board, and applying from a roll-form a thin, thermoplastic polymer film material characterized by one surface having a low-frictional smooth surface and laminating, such as by heat, adhesive or otherwise securing the other surface of the thermoplastic film material to the bottom surface and the lower side rail surfaces of the preformed board, to provide a low-friction surface on the bottom surfaces and also extending the film to the lower side rail surfaces, which film material also stiffens mechanically the overall structure of the board, thus permitting the employment of a lower density, closed-cell foam material in the upper surface while not affecting the overall mechanical and structural stability of the board.

Generally, prior art boards, over which the present invention comprises a significant and unexpected improvement, have an inner core of a low density foam material, which may be, for example, polyethylene or other foam material, and then a closed-cell, a polyethylene or cross-linked polyethylene upper or lower materials which are laminated over the entire inner core material, and by heat-lamination, and on such lamination, the entire preformed, preshaped board is formed together with the tail and side rails.

Commercial prior art boards are provided with a low-frictional, gliding surface on the bottom surface only, with the employment of a generally rather thick, for example, 20 mils or greater, polymer film laminate, such as a polyethylene or other polymer having a thin layer for example, 10–15 mils of a thermoplastic foam material on one surface, which is used in a heat-laminating process, and heat-laminated by uniform pressure to the bottom surface after being cut. The cut film material is then heat-laminated and pressed to the lower bottom surface, the upper and lower rail surfaces, and the top surface left as a closed-cell foam surface with a much higher frictional density to permit a user to ride on the top surface, and also to permit a user to grasp the side rails for maneuverability.

The improved sports board is prepared by employing a film laminate material comprising a solid layer of a thin plastic polymer, typically a polyethylene, such as a cross-linked polyethylene, or preferably a cross-linked polyethylene mixed with minor amounts, for example, 1 to 10%, such as 3 to 6% of an ethylene vinyl acetate polymer, the solid film having a thickness from about 5 to 10 mils, having secured thereto a thermoplastic foam layer, typically, but not necessarily of the same foam layer materials, generally ranging in total from about 5 to 30 mils, in order to employ the foam layer to heat-laminate the foam layer to the bottom and side rail surfaces of the sports board. The polymer film material employed provides a low-frictional surface and is of much less thickness than that required by the prior art. Generally, the polymer film is applied both to the bottom surface and each of the lower side rail surfaces at the same time to cover completely such surfaces, while it leaves the upper rail surfaces and the top surfaces of the board composed of a polyethylene foam material, which provides for a higher frictional surface on the sports board. Only the lower side rail and lower surface have a low-frictional surface. The application of the polymer film on the lower side rail surfaces does not interfere with the maneuverability of the board or the grasping of the side rail surfaces by the user, and yet extends the frictional riding surface in contact with the water or gliding surface and provides increased stiffening of the overall surface of the board. If desired, and preferably, the film material may also extend to any lower rail surfaces comprising the back or forward end of the board. The side rail surfaces generally may vary in shape, but the side rail surfaces would represent angularly outwardly extending, generally straight side rail surfaces with the lower and upper surface coming together generally intermediate the thickness of the board.

A wide variety of polymeric materials may be employed as the polymeric film, for the gliding surface and the foam surface. The lower bottom surface of the gliding or low-frictional surface should be a smooth surface with low-frictional characteristics, while the opposite surface may be solid or more typically foam and composed of a thermoplastic foam, so that that surface may be heat-laminated to the bottom surface of the sport board.

The sports board may be comprised of a single closed-cell foam material, but more usually is comprised of an inner core of lower density material, and may vary in foam composition, but generally is about a two-pound polyethylene inner foam core, and with the upper or lower laminate sheet material comprised of a closed-cell foam material, and more particularly a cross-linked olefinic type, such as a cross-linked polyethylene material. The film material employed in the polymer film may comprise mixtures of the polyethylene with a polymer additive like an ethyl vinyl acetate polymer.

It is recognized that side rail surfaces on either side of the sports board may vary in form and shape, thus the employment of a lower side rail surface directed to that surface which extends below the planar surface of the sports board.

The invention will be described for the purposes of illustration only in connection with certain illustrated embodiments; however, it is recognized that those persons skilled in the art may make various modifications, changes and additions to the illustrated embodiment without departing from the spirit and scope of the invention.

DESCRIPTION OF THE EMBODIMENTS

Figure 1:
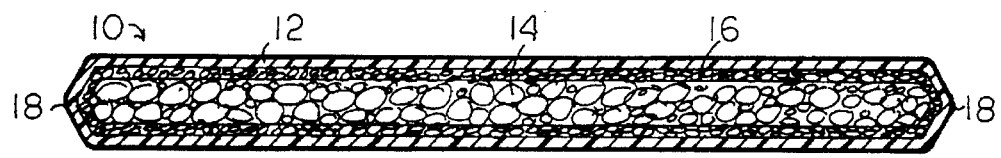
FIG. 1 is a cross-sectional view of a prior art sports board cut from side to side.

In the drawings, FIG. 1 shows a prior art sports board 10, with a low-frictional polyethylene film material 12 heat-laminated on all surfaces, the board 10 having an inner core of low density closed-cell foam material 14. A layer of closed-cell foam 16 with a greater density than the inner foam core is heat-laminated to the film material 12 and allowed to cool, to allow for heat-laminating adherence of the outer polymer film layer 12 to the inner core 14. FIG. 1 further shows the side rails 18 with the thermoplastic polymer film layer 12 thereon.

Figure 2:
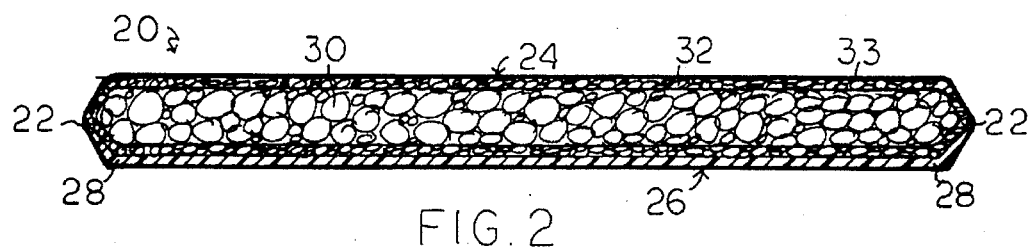
FIG. 2 is a cross-sectional view of the sports board of the invention cut along lines 2—2 of FIG. 3.

FIG. 2 shows a sectional view of the sports board of the invention 20, with an inner core composed of a low density, closed-cell foam material 30. An outer core of higher density closed-cell foam material 32 is shown, adhered by heat-laminating to a thin layer of low-friction, thermoplastic polymer film material 28. The outer core foam material 32 and film material 28 is heat-laminated to the bottom foam surface 26 and to the bottom portion of the side rails 22. The top surface 24 of the sports board 20 is shown without the low-frictional film material 28 thereon, an outer layer of heat-pressurized closed-cell foam providing a top surface 24 to the board 20.

Figure 3:
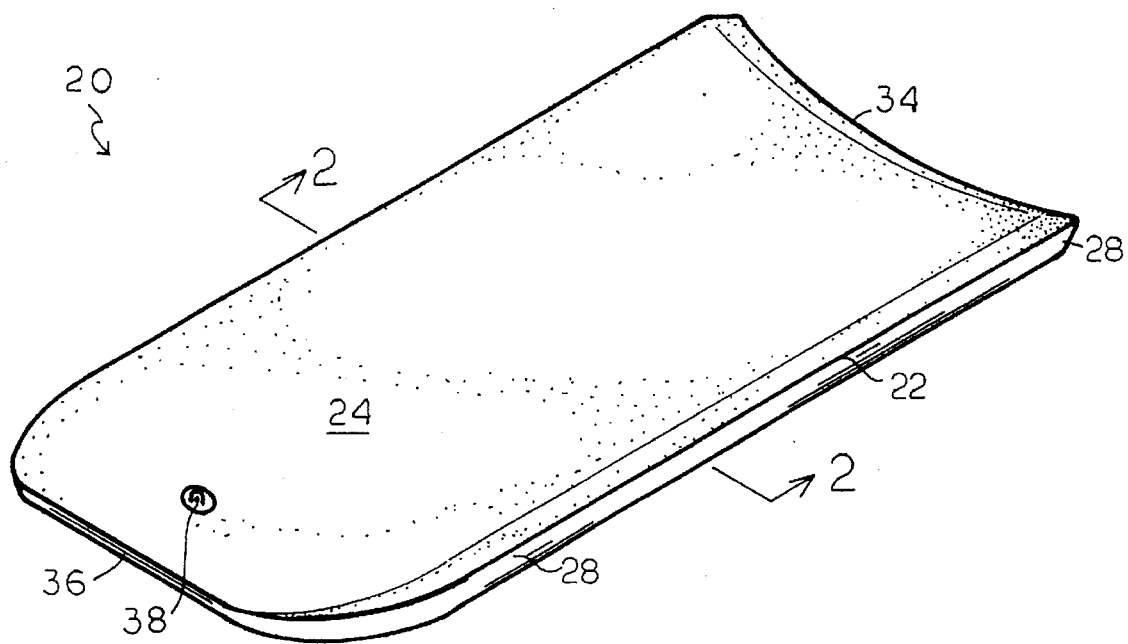
FIG. 3 is a perspective view from above of the sports board of the invention.

FIG. 3 shows a perspective view of the sports board of the invention 20 with a top surface 24 composed of compressed, high density, closed-cell foam material. The side rails 22 are shown extending angularly and with the top portion composed of closed-cell foam material and the bottom portion having the low-frictional thermoplastic polymer film 28 heat-laminated thereon. The curved, angular back tail 34 of the board is shown composed of the closed-cell foam material, and the curved front 36 of the board 20 is shown with the low-frictional, thermoplastic polymer film extending from the bottom portion of the side rails along the bottom surface. FIG. 3 also shows a wrist leash holder 38 inserted through the sports board.

Figure 4:
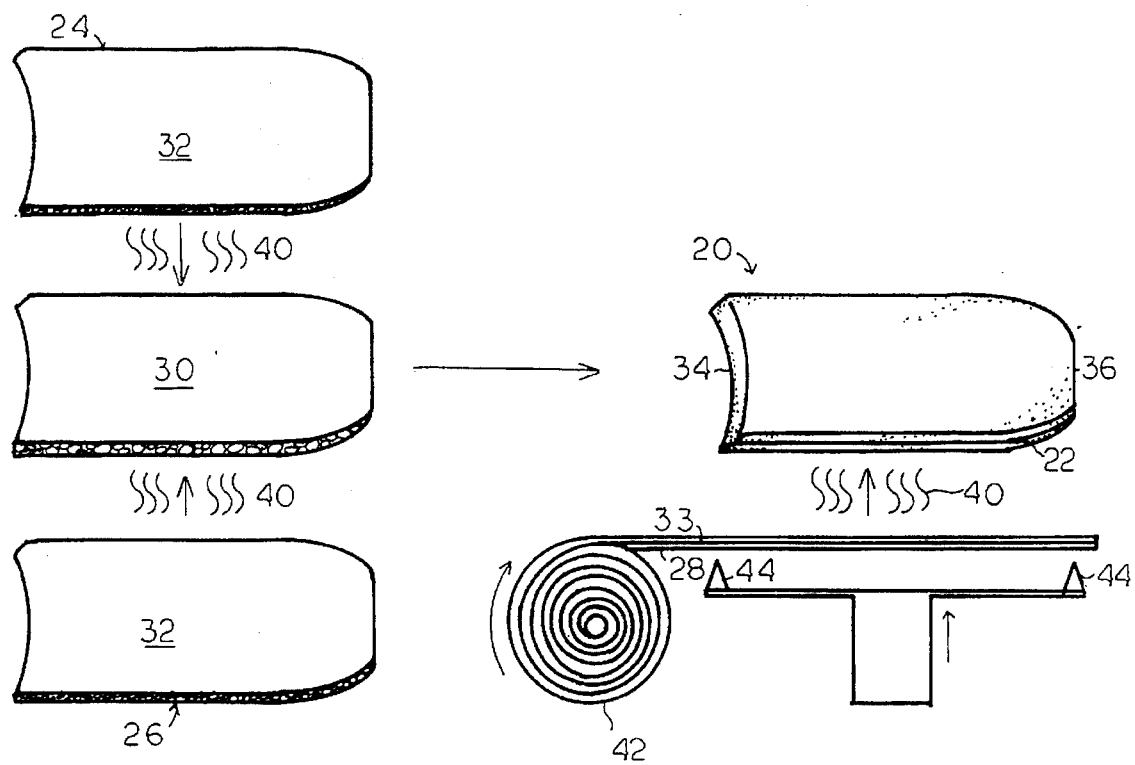
FIG. 4 is a partially schematic view of the method of making the sports board of the invention.

FIG. 4 shows a partially schematic diagram of the method of making the sports board of the invention. A preshaped, preformed inner core of low density closed-cell foam material 30 has an upper and lower foam boards 32 heat-laminated thereto, which upper and lower boards form the side rails 22. The upper and lower boards 32 are composed of a closed-cell foam material of greater density then the inner core 30, and provide stiffness to the board in use. The heat-laminating and compression forming of the outer foam core 32 further provides a top surface 24 for the top of the sports board 20, and the top portion of the side rails 22 and front 36 and back 34 of the board.

After the inner and outer cores of the board are heat-laminated together by heat-laminating 40, a low-frictional polymer film material 28, having a polymer additive of ethyl vinyl acetate 33 heat-laminated thereon for adherence purposes, which film material 28 is supplied in a roll form 42, is unrolled and die cut 44 to fit the bottom surface of the sports board 20, to conform to the bottom surface and lower side rail and lower front surface of the board. The film layer 28 with the heat-laminating layer 33 is then heat-laminated 40 to the bottom surface 26 and the lower side rail and lower front surface of the board. This film layer 28 provides a smooth, low-frictional surface to the bottom of the sports board and further provides additional stiffness to the board for strength and rigidity of the board in use.

What is claimed is:

1. A sports board for use on a gliding surface, which sports board consists essentially of:

a) a preformed, preshaped generally planar board composed of a closed-cell, thermoplastic, polymer foam material, the board having a bottom surface, a top surface, two side surfaces and front and back surfaces, and the board arranged and constructed in length, width and thickness to support a user for gliding purposes, the board characterized by having angularly outwardly extending side rails extending generally from the one to the other end of the board, and comprising an upper and lower side rail surface;

b) an integral, low-frictional thermoplastic polymer film material laminated to the bottom surface of the board, and extending from the bottom surface continuously upwardly and laminated only to the lower side rail surfaces of the board, the polymer film material having a thickness of less than about 12 mils, the polymer film material providing a bottom surface and lower side rail surface of a low-frictional, smooth polymer film surface suitable for gliding purposes, and to provide, by the lamination of the polymer film material on the lower rail surfaces and the bottom surfaces, a mechanical stiffening of the overall structure of the body board; and c) the upper side rail surfaces and the upper surface of the board comprised of the frictional closed-cell foam material.

2. The board of claim 1 wherein the polymer film material has a thickness of about 1–10 mils.

3. The board of claim 1 wherein the polymer foam material, which comprises the upper rail surfaces and the upper surface of the board is a polyethylene or cross-linked polyethylene foam material.

4. The board of claim 1 wherein the polymer film material, comprising a polyethylene film material blended with a minor amount of an ethylene vinyl acetate polymer.

5. The board of claim 1 wherein the upper and lower side rail surfaces intersect generally intermediate the thickness of the board.

6. The board of claim 1 wherein the board includes an inner core foam board and a pair of outer core foam boards of greater density than the inner core board laminated to the inner core board.

7. The board of claim 1 wherein the polymer film material comprises a single, diecut, integral film material, and pressure and heat-laminated to the bottom surface and the lower rail surface of the board.

8. The board of claim 1 which includes an upper and lower arcuate rail surfaces partially on the front end of the board, and the film material extends over the lower arcuate rail surface.

9. The board of claim 1 which includes a pair of extended tails and an arcuately curved upper rail surface across the back end of the rail which comprises a closed-cell foam surface.

10. A method of manufacture of a sports board with a bottom gliding surface, which method comprises:

a) providing a generally planar, preshaped, preformed board composed of a frictional closed-cell foam material having a top surface, a bottom surface and upper and lower side rail surfaces extending from one to the other end of the board, and on opposite sides thereof;

b) applying a solid polymer film material having a thickness of less than about 12 mils from a roll form and diecutting the polymer film material from the roll form to conform to the bottom surface and the lower side rail surfaces of the board;

c) the polymer film characterized by having one surface as a smooth, low-frictional gliding surface; and d) laminating one surface of the diecut polymer film to the bottom surface and to the lower side rail surfaces of the board to provide a low-frictional gliding surface on the bottom surface and on the lower side surfaces on the board, and to stiffen mechanically the overall structure of the board and to provide the frictional closed foam surface on the top surface and the upper rail surfaces.

11. The method of claim 10 which includes applying a polymer film material which has one solid, low-frictional smooth layer, and an other layer having a thin, thermoplastic foam material thereon, and pressure-and heat-laminating the thin thermoplastic foam material to the bottom surface and lower side rail surfaces of the board.

12. The method of claim 10 wherein the solid polymer film layer material has a thickness of less than about 1 to 10 mils.

13. The method of claim 10 wherein the solid polymer film material comprises a polyethylene blended with about 1 to 10% of an ethylene vinyl acetate polymer.

14. The sports board produced by the method of claim 10.

15. The method of claim 11 wherein the polymer film material includes from about 5 to 30 mils of a polyethylene foam layer and the solid film layer comprises a polyethylene-ethylene vinyl acetate blend.

* * * * *